United States Patent [19]

Altenpohl et al.

[11] 4,148,397

[45] Apr. 10, 1979

[54] SELECTOR LOGIC FOR WEIGHT SORTING SYSTEMS

[75] Inventors: William F. Altenpohl; Paul J. Altenpohl, both of High Point, N.C.

[73] Assignee: W. F. Altenpohl, Inc., High Point, N.C.

[21] Appl. No.: 797,742

[22] Filed: May 17, 1977

[51] Int. Cl.² .............................................. B07C 5/22
[52] U.S. Cl. .................................... 209/559; 209/592
[58] Field of Search ............... 209/73, 74 R, 121, 559, 209/592

[56] References Cited

U.S. PATENT DOCUMENTS 3,622,000 11/1971 McClenny ............................ 209/121
3,680,693 8/1972 Altenpohl et al. ............. 209/121 X Primary Examiner—Joseph J. Rolla
Attorney, Agent, or Firm—Clarence A. O'Brien; Harvey B. Jacobson

[57] ABSTRACT

Sensors associated with a pair of weighing devices of a weight sorting system are operative through a logic circuit to effect release of loads from conveyor carriers. Lockout and reset actions produced internally of the logic circuit distinguish between sequential signals produced by the sensors and a single signal produced by one of the sensors during any monitoring cycle, to effect release of the loads between upper and lower weight limits, respectively, established by said weighing devices.

5 Claims, 4 Drawing Figures

SELECTOR LOGIC FOR WEIGHT SORTING SYSTEMS

BACKGROUND OF THE INVENTION

This invention relates to weight sorting systems for poultry, or the like.

Weight sorting systems of the type disclosed in U.S. Pat. Nos. 3,291,303 and 3,680,693, widely marketed as a selector scale system, are well known in the art. Such weight sorting systems are associated with poultry carriers rollingly supported on a fixed track and conveyed therealong by an overhead conveyor chain. A pair of adjacent weighing stations are established by a pair of vertically movable track sections aligned in a gap of the fixed track, so as to load a pair of scale beam types of weighing devices set to establish upper and lower weight limits. A load releasing latch on each carrier is tripped by a power operated release device mounted just downsteam of the weighing stations to release the load from the carrier if it is between the upper and lower weight limits. The first weighing device or station in the direction of travel establishes the upper weight limit while the lower weight limit is established at the second weighing station.

The foregoing prior art weight sorters require and include a lockout device which is rendered operative in response to detection of a load above the upper weight limit at the first weighing station, to mechanically prevent operation of the weighing device associated with the second weighing station. Thus, if the load is below the upper weight limit, the lockout device remains inactive so that if the load is above the lower weight limit, it will be detected by the second weighing device. Operation of the second weighing device then triggers the load release device. Release of the load is detected by a reset switch in order to reset the controls for another weight sorting operation.

Timely operation of the aforementioned lockout device and reset switch imposes limitations on the spacing between weighing stations and between the carriers along the conveyor path because of the distance the load must travel along the movable track sections to insure that the scale beams of the weighing devices are unbalanced for a sufficiently long time to effect the lockout and release functions. Mechanical lockout of the second weighing device and actuation of the reset switch are also sources of malfunction normally expected of separate mechanical components in a system. It is, therefore, an important object of the present invention to provide a weight sorting system of the aforementioned type that avoids the spacing limitations and eliminates use of separate mechanical lockout and reset switch devices.

SUMMARY OF THE INVENTION

Except for the elimination of the separate lockout and reset switch devices, the weight sorting apparatus of the present invention is similar in arrangement to that disclosed in U.S. Pat. No. 3,680,693, wherein fluidic controls are utilized. The lockout and reset functions are performed entirely within a logic control unit itself to substantially reduce the relatively longer operational interval heretofore associated with operation of the lockout and reset devices. Consideration need only be given to signal pulse time and signal pulse duration necessary for operation of the power operated release device and release of the load.

In accordance with the present invention, separate signal pulses sequentially produced by sensors detecting operation of both weighing devices during a weight sorting or monitoring cycle produces a lockout action internally of a control unit rendered ineffective to actuate the release device. On the other hand, a single signal pulse produced during a monitoring cycle by the sensor detecting operation of the second weighing device setting the lower weight limit, generates a load release signal which is effective to actuate the release device and reset the control logic. A signal delay device prolongs the release signal for the desired duration and delays reset of the logic circuitry.

In one embodiment of the invention, the control logic includes a pair of series connected binary counters that are placed in a down count condition by the delayed reset signal to accept input pulses from the second sensor. These counters are conditioned by signal pulses from the first sensor detecting operation of the first weighing device. Binary outputs of the counters are applied to a NAND gate producing a release signal output whenever the same binary logic signals are simultaneously applied to the two inputs of the gate. At the end of a delay period, the release signal generates the aforementioned reset signal. Although fluidic logic modules are utilized in a fluidic type control circuit, it is contemplated that solid-state electronic components could be substituted for the fluidic modules to form an equivalent electronic control circuit.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWING FIGURES

DETAILED DESCRIPTION OF PREFERRED EMBODIMENT

Figure 1:
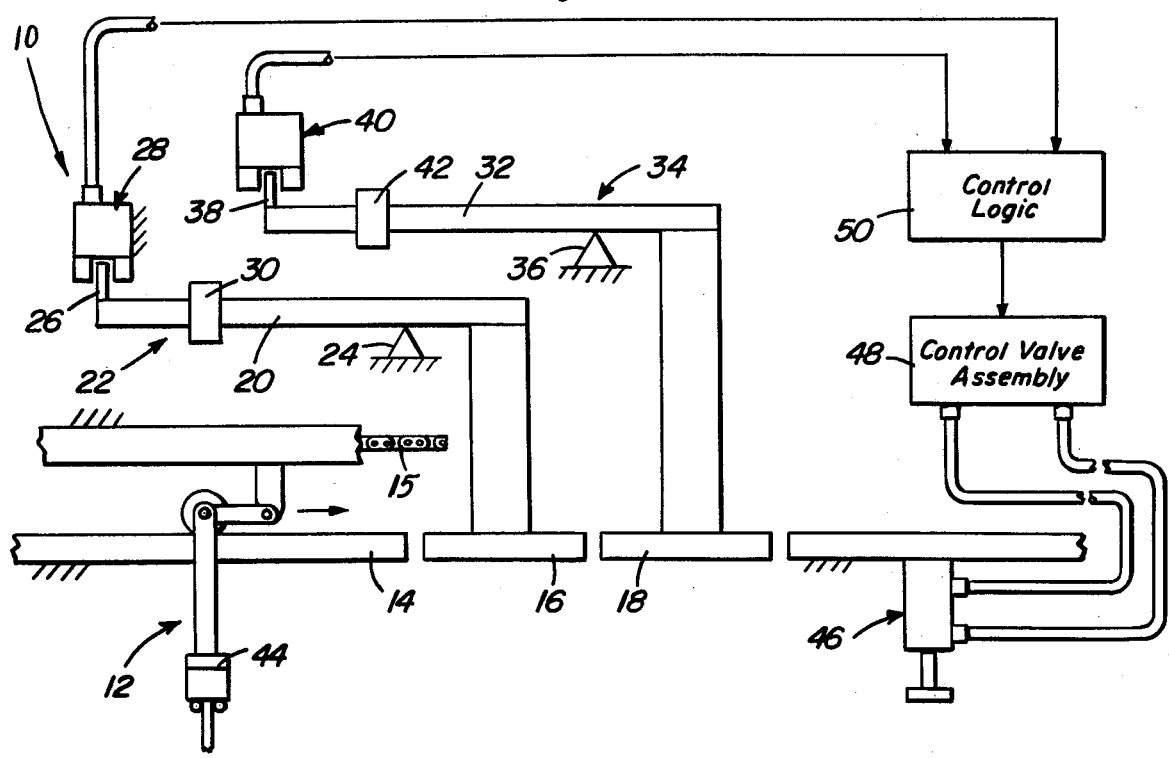
FIG. 1 is a somewhat simplified, schematic side elevation view of a weight sorting system assembly arranged in accordance with the present invention.

Referring now to the drawings in detail, FIG. 1 illustrates a typical arrangement of the system of the present invention, generally referred to by reference numeral 10. A plurality of poultry carriers 12 of the Altenpohl type are rollingly supported on a fixed track 14 for movement along a predetermined path in one direction under the pull of a conveyor chain 15. A pair of weighing stations are established in said path by a pair of vertically movable track sections 16 and 18 aligned with the fixed track within a gap formed therein. These track sections are momentarily loaded in sequence by each carrier as it is conveyed along the path across the gap in the fixed track. Track section 16 is suspended from one end of a scale beam 20 associated with a weighing device 22 through which an upper weight limit is established. The scale beam 20 has a fulcrum 24 and an interrupter element 26 at the other end associated with an interruptable jet type of fluidic sensor 28 that is per se well known in the art. A balancing weight 30 is set at an adjusted position on the scale beam to establish the desired upper weight limit above which the scale beam 20 is unbalanced by a load to upwardly displace the interrupter 26 and produce a signal from the sensor 28. Similarly, track section 18 is connected to one end of scale beam 32 associated with weighing device 34 to detect loads above a lower weight limit. The beam 32 has a fulcrum 36 and an interrupter element 38 at its other end associated with a second fluidic sensor 40 of the same type as sensor 28. A balancing weight 42 on the scale beam 32 sets the lower weight limit. The load carried by carrier 12 is released by upward displacement of a release latch arm 44 effected by operation of a power operated release device 46 on the downstream side of the weighing stations.

Figure 2A:
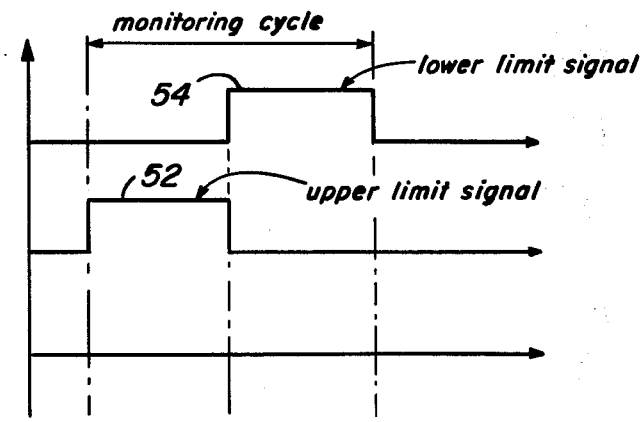
FIGS. 2A and 2B are graphical diagrams illustrating certain signal relationships associated with the present invention.
Figure 2B:
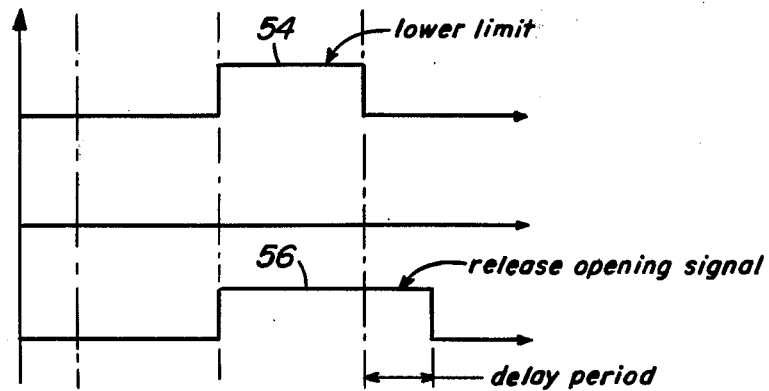

In accordance with the present invention, the release device 46 is actuated through a control valve assembly 48 by a control logic unit 50 under control of signals produced by the sensors 28 and 40. Signals 52 and 54 produced in sequence by both sensors during a weight sorting or monitoring cycle, as depicted in FIG. 2A, does not cause the control logic to generate any release operating signal. However, a single release signal 54 produced by sensor 40 during a monitoring cycle, produces a prolonged release operating signal 56 of the requisite duration as depicted in FIG. 2B. The control logic thus recognizes only a single signal produced by the second sensor 40 during a monitoring cycle reflecting the detection of a load within the desired weight range.

Figure 3:
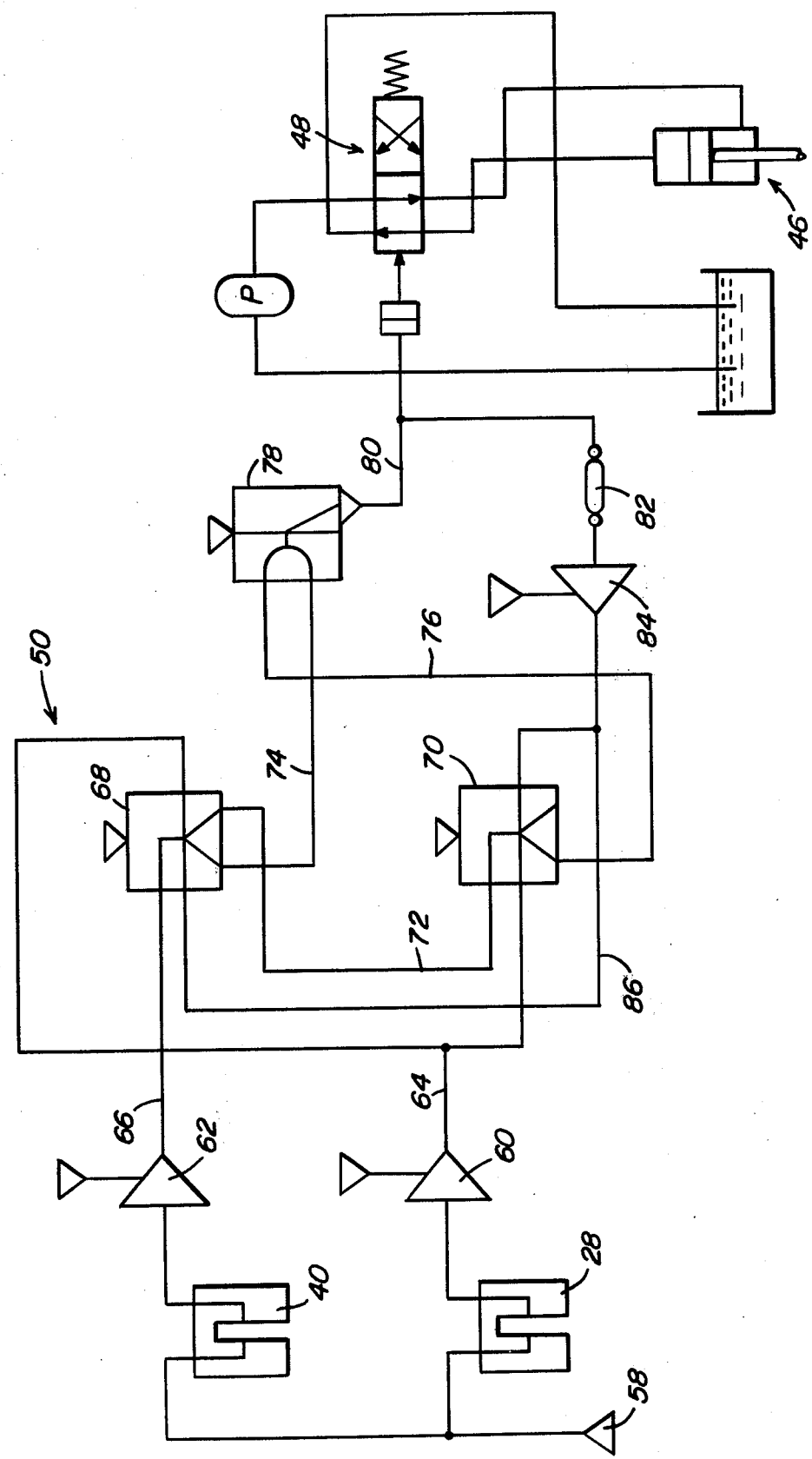
FIG. 3 is a fluidic circuit diagram illustrating the logic controls associated with the present invention.

FIG. 3 shows the fluidic circuit of the control logic 50 connected between the sensors 28 and 40 and the actuator of the control valve 48. The sensors are connected to a suitable pressure fluid source 58 so as to produce signals in response to operation of the weighing devices. Interface amplifiers 60 and 62, such as fluidic diaphragm amplifier modules, connect the sensors through input signal lines 64 and 66 to a pair of fluidic binary counter modules 68 and 70. Each of these counter modules has, in addition to a fluid pressure supply port, a toggle input port, a pair of control ports and a pair of output ports, as is well known in the art. Input signal line 64 is connected to the reset control port of module 68 and the set control port of module 70. The input signal line 66 is connected to the toggle input port of module 68. One of the output ports of module 68 is connected by line 72 to the toggle input port of module 70 while the other output port of module 68 and one of the output ports of module 70 are respectively connected by lines 74 and 76 to the input ports of a gate module 78. When control signals are simultaneously applied to both input ports of the gate module 78, an output appears in output line 80 connected to its active output port in order to actuate the control valve 48. A time delay module 82 connects the output signal line 80 to another fluidic diaphragm amplifier 84, for supply of a resetting signal through line 86 to the set control port of module 68 and the reset control port of module 70. The diaphragm amplifiers 60, 62 and 84, the sensors 28 and 40, the binary counter modules 68 and 70, the gate module 78 and the time delay module 82 are all well known fluidic logic components manufactured, for example, by C. A. Norgren Co., of Littleton, Colorado, and disclosed in its publication "Norgren Fluidics", copyrighted 1974.

In the quiescent state, the counter module 68 is in a set condition with line 74 connected to the zero or low pressure output port while the counter module 70 is in its reset condition so that its supply port pressurizes line 76. The logic "1" output port of module 68 is then connected by line 72 to the toggle input port of module 70 in a count down configuration. When a signal is applied only by sensor 40 to input signal line 66 during a monitoring cycle, a down count function is performed in module 68 wherein the output is changed so that line 74 becomes pressurized. With both lines 74 and 76 pressurized, the gate module 78 switches to an active state pressurizing output line 80 so as to actuate the control valve 48. The output in line 80 is prolonged sufficiently to insure release of the load by the release device 46 by delaying the output signal fed to the amplifier 84 through the time delay module 82. The delayed resetting signal is fed through line 86 to the control ports of the counter modules 68 and 70 in order to restore the fluidic circuit to the quiescent state aforementioned.

Should sensor 28 initially detect operation of its weighing device before sensor 40 produces a signal during a monitoring cycle, the signal in line 64 resets module 68 and sets module 70. Line 74 is thereby pressurized through module 68 but line 76 is at the same time depressurized through module 70 so that there is no switching of the gate module 78. If a signal from sensor 40 in line 66 follows, the outputs of both modules 68 and 70 are toggled or changed to reverse the pressure levels in lines 74 and 76 without effecting any switching of the gate module 78. Thus, the action of an initial signal from sensor 28 during a monitoring cycle serves a lockout function. The counter modules 68 and 70 following the lockout action are restored to the quiescent condition either by a second sequential signal from sensor 40 or by the action of the next output signal in line 80.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pair of monitoring devices independently operable during a monitoring cycle respectively establishing upper and lower limits for articles conveyed by carriers along a path, a control system comprising signal operated release means actuated in response to operation of one of said monitoring devices during said monitoring cycle for removal of articles from said carriers, logic means connected to both of said monitoring devices for rendering said one of the monitoring devices ineffective to actuate the release means in response to sequential operation of both of the monitoring devices during the monitoring cycle, means operative independently of carrier travel along said path for prolonging operation of the release means beyond said monitoring cycle, and means responsive to termination of said operation of the release means for resetting the logic means.

2. In combination with a pair of independently displaceable monitoring devices respectively establishing upper and lower limits for objects conveyed on carriers along a path of travel, a logic control system comprising a pair of sensors respectively producing signal pulses of predetermined duration in response to displacement of said monitoring devices, means responsive to the signal pulse produced by one of the sensors establishing the lower limit for generating a release signal, means responsive to the signal pulses produced in sequence by the sensors for preventing generation of the release signal, load releasing means actuated by said release signal for removal of an object from a carrier during travel along said path, means operative independently of carrier travel for prolonging the release signal and operation of the load releasing means beyond the duration of the signal pulse produced by said one of the sensors, and means responsive to termination of the prolonged release signal for resetting the logic control system.

3. In combination with a weight sorting system having a fixed track, a pair of track sections aligned with said track along a common path, a plurality of carriers movable on said track along said common path, a pair of weighing devices connected to the track sections for detecting loads thereon, conveyor means connected to said carriers for movement thereof past both of said track sections in sequence during a weight monitoring cycle, and means for releasing loads supported on the carriers, the improvement residing in logic control means operated by the weighing devices for actuating the load releasing means, comprising a pair of sensors respectively detecting operation of said weighing devices to establish upper and lower weight limits, means responsive to only one of said sensors detecting operation of one of the two weighing devices during the monitoring cycle for generating a load releasing signal, means responsive to both of said sensors sequentially detecting operation of the weighing devices during the monitoring cycle for producing an internal lockout action preventing generation of the load releasing signal, means for actuating the releasing means in response to said load releasing signal during the monitoring cycle, whereby only loads between said upper and lower weight limits are diverted from said common path, delay means operative independently of carrier travel along said common path for prolonging the load releasing signal beyond the monitoring cycle and means for resetting the logic control means in response to termination of the prolonged releasing signal.

4. In combination with a pair of monitoring devices independently operable during a monitoring cycle respectively establishing upper and lower limits for articles conveyed along a path, a control system comprising signal operated release means actuated in response to operation of one of said monitoring devices during said monitoring cycle, for removal of articles from said path, and logic means connected to both of said monitoring devices for rendering said one of the monitoring devices ineffective to actuate the release means in response to sequential operation of both of the monitoring devices during the monitoring cycle, said logic means including a pair of sensors respectively connected to the monitoring devices, a pair of series connected binary counter modules respectively switched between set and reset conditions, means connecting one of the sensors to one of the counter modules for producing binary output signals from both of the counter modules, means connecting the other of the sensors to both of the modules for switching thereof between the reset and set conditions, gate means connected to both of the modules for producing a release signal in response to simultaneous reception of the same binary output signals and resetting means connecting the gate means to the modules for switching thereof between the reset and set conditions in response to said release signal.

5. The combination of claim 4 including delay means for prolonging the duration of the release signal and delaying switching of the modules by the resetting means.

* * * * *